United States Patent [19]
Iwahashi

[11] Patent Number: 4,886,145
[45] Date of Patent: Dec. 12, 1989

[54] UNDERGROUND VEHICLE LIFT

[75] Inventor: Kunimitsu Iwahashi, Handa, Japan

[73] Assignee: Sugiyasu Industries Co., Ltd., Japan

[21] Appl. No.: 216,369

[22] Filed: Jul. 8, 1988

[30] Foreign Application Priority Data

Jul. 10, 1987 [JP] Japan ............................ 62-106538

[51] Int. Cl.[4] ............................ B60S 13/00
[52] U.S. Cl. ............................ 187/8.71; 254/89 H
[58] Field of Search .................. 187/8.71, 8.72, 8.41, 187/8.62, 18; 254/89 R, 89 H, 91, 93 R

[56] References Cited

U.S. PATENT DOCUMENTS 2,576,158 11/1951 Wallace ............................ 187/8.71

FOREIGN PATENT DOCUMENTS 690682 9/1930 France ............................ 187/8.72
1123199 9/1956 France ............................ 187/8.72

*Primary Examiner*—F. J. Bartuska
*Assistant Examiner*—Kenneth Noland
*Attorney, Agent, or Firm*—Lahive & Cockfield

[57] ABSTRACT

A vehicle lift of the type which is installed in a pit includes at least two vertically expanding and contracting jacks disposed in the pit in a mutually juxtaposed relation and each comprising a pair of vertically disposed parallel link mechanisms which can be vertically expanded and contracted together. A pair of rollers are provided on each jack. A pair of rails are provided at the bottom of the pit in that area thereof in which each jack is situated, and the rollers are rollably supported on the rails, respectively. A vehicle supporting table is horizontally supported on each jack. A hydraulic cylinder is provided on each jack and has a piston rod connected to the link mechanisms for expanding and contracting them and thereby the jack to thereby raise and lower the table. At least one of the jacks is provided with another pair of rollers supported rollably on the rails, and a system for moving the jack horizontally along the rails toward and away from the other jack.

8 Claims, 2 Drawing Sheets

UNDERGROUND VEHICLE LIFT

BACKGROUND OF THE INVENTION

1. Field of the Invention:

This invention relates to a vehicle lift of the type which is installed under the ground or floor. It is used for lifting a vehicle above the floor when repairing it.

2. Description of the Prior Art:

There are known underground vehicle lifts which are wholly installed in a pit, as disclosed, for example, in Japanese Utility Model Application Laid-Open No. 72495/1985 and Japanese Utility Model Application Laid-Open No. 145194/1985. They include jacks which are provided with upright cylinders and upright piston rods carrying a vehicle supporting table at their upper ends. The pit within which the upright cylinders can be completely accommodated has, however, a depth of at least, say, 2.5 m. The excavation of such a deep pit costs a great deal. The installation of the lift in such a pit is also a costly job and its maintenance is not an easy task, either.

There are also known lifts which are partly installed in a pit. One of the jacks is installed under the floor, while the other jack is situated on the floor. This type of jack also has a number of drawbacks. Its installation, including piping work, costs a great deal. If any leakage of a hydraulic fluid results from the breakage or corrosion of the piping, the piston in a cylinder is likely to drop suddenly and thereby cause a serious hazard to the operator. These kinds of trouble also create a very hard repair job.

SUMMARY OF THE INVENTION

It is, therefore, an object of this invention to provide an improved underground vehicle lift which is easy, economical and safe to instal, operate, maintain and repair and can be used for lifting vehicles of different lengths, and which can accordingly overcome the drawbacks of the prior art as hereinabove pointed out.

This object can be essentially attained by a lift including two or more jacks each comprising a pair of vertically expanding and contracting link mechanisms, at least one of the jacks being movable toward and away from the other jacks.

The jacks have only a very small height when the link mechanisms have been vertically contracted. The lift can, therefore, be installed in a pit having only a very small depth. At least one of the jacks is movable to vary the effective length of the lift to adapt it to any vehicle length.

Other features and advantages of this invention will be apparent from the following description and the accompanying drawings.

DETAILED DESCRIPTION OF THE INVENTION

Figure 1:
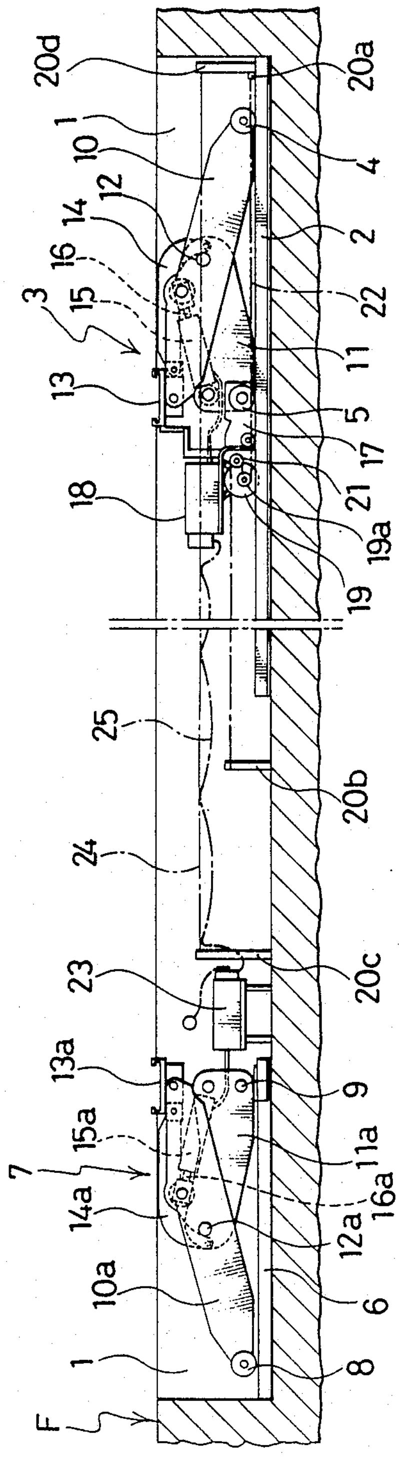
FIG. 1 is a front elevational view of a vehicle lift embodying this invention.
Figure 2:
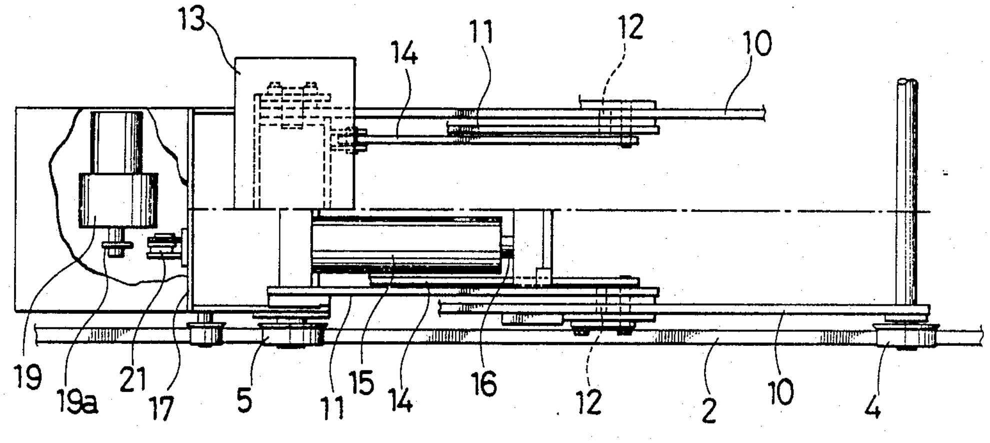
FIG. 2 is a fragmentary enlarged top plan view of a movable jack in the lift shown in FIG. 1.

A vehicle lift embodying this invention is situated in a pit 1 made under the floor F, as shown in FIG. 1. The pit 1 is rectangular and has a first longitudinal portion and a second longitudinal portion. A pair of rails 2 are provided at the bottom of the pit 1 and extend in parallel to each other along its first longitudinal portion. A movable jack 3 is horizontally movably supported on the rails 2. Another pair of parallel rails 6 are provided at the bottom of the second longitudinal portion of the pit 1. A stationary jack 7 is supported on the rails 6.

The movble jack 3 comprises a pair of substantially inverted Y-shaped parallel link mechanisms which are each formed by an outer link 10 and an inner link 11 having an upper end connected rotatably to the midportion of the outer link 10 by a pin 12. Each of the two outer links 10 is provided at its lower end with a roller 4 and each of the two inner links 11 is likewise provided at its lower end with a roller 5. The rollers 4 and 5 are rollably supported on one of the rails 2. The two rollers 4 are provided for causing the jack 3 to expand or contract and also moving it horizontally, while the two rollers 5 are used only for moving the jack 3 horizontally. A vehicle supporting table 13 lies transversely of the jack 3 and is horizontally supported on the upper ends of the outer links 10. The jack 3 also includes another pair of parallel links 14 lying inwardly of the inner links 11, respectively, and each having an upper end connected rotatably to the bottom of the table 13, while the lower end thereof is rotatably connected to one of the inner links 11 adjacent to the pin 12. A pair of hydraulic cylinders 15 are provided in parallel to each other inwardly of the links 14, respectively. Each cylinder 15 has a lower end connected rotatably to one of the inner links 11 above the roller 5 and is provided with a piston rod 16 having an upper end connected rotatably to one of the outer links 10 above the pin 12.

A carrier 17 is connected to a shaft for the rollers 5 and supports a hydraulic unit 18 and an electric motor 19 below the hydraulic unit 18. A roller chain 22 extends between a prop 20*a* provided at one end of one of the rails 2 and another prop 20*b* provided adjacent to the other end thereof in the middle portion of the pit 1. The chain 22 extends past a sprocket 19*a* attached to the output shaft of the motor 19 and another sprocket 21 that is provided on the carrier 17 and situated between the prop 20*a* and the sprocket 19*a*, so that the chain 22 may form a zigzag curve around the sprockets 19*a* and 21. The carrier 17, the motor 19 and the roller chain 22, thus, form a mechanism for moving the jack 3 horizontally.

The stationary jack 7 is of the same construction as the movable jack 3, except that it does not include any of the carrier 17, motor 19, sprocket 21 and roller chain 22 defining the mechanism for moving the jack 3, as will hereinbelow be described, though the following description may be substantially a repetition of a part of the foregoing.

The jack 7 comprises a pair of parallel link mechanisms which are each formed by an outer link 10*a* and an inner link 11*a* connected rotatably to the outer link 10*a* by a pin 12*a*. Each outer link 10*a* is provided with a roller 8 at its lower end. A vehicle supporting table 13*a* lying transversely of the jack 7 is horizontally supported on the upper ends of the outer links 10*a*. The two rollers 8 are rollable on the rails 6, respectively, for causing the jack 7 to expand or contract, as the outer links 10*a* are rotatable about the pins 12*a*, while the lower ends of the inner links 11*a* are rotatably connected to a shaft 9 fixed to the rails 6. Another pair of links 14*a* are provided inwardly of the inner links 11*a*, respectively. The upper ends of the links 14a are rotatably connected to the bottom of the table 13a and the lower ends thereof are rotatably connected to the inner links 11a, respectively, adjacent to the pins 12a. A pair of hydraulic cylinders 15a are provided inwardly of the links 14a, respectively. Each cylinder 15a has a lower end connected rotatably to one of the inner links 11a adjacent to the shaft 9 and includes a piston rod 16a having an upper end connected rotatably to one of the outer links 10a above the pin 12a.

A hydraulic unit 23 is disposed in the middle portion of the pit 1 between the rails 2 and the rails 6 for supplying a hydraulic fluid to the jack 7 when it is supplied with power from a power source not shown. A wire rope 24 extends between a prop 20c provided adjacent to the hydraulic unit 23 and on the opposite side thereof from the jack 7 and a prop 20d provided at that end of the pit 1 near which the movable jack 3 is situated. An electric cord 25 is suspended from the wire rope 24 and is connected between the hydraulic unit 23 and the hydraulic unit 18 for supplying power to the hydraulic unit 18 to supply a hydraulic fluid to the jack 3. Motors for driving the two hydraulic units 18 and 23, which are not shown, are electrically controlled to ensure the synchronous operation of the two jacks 3 and 7.

A pit cover not shown is provided for covering the top of the pit 1 and is slidable longitudinally of the pit 1. The cover is movable with the table 13 when the jack 3 is horizontally moved.

When the motor 19 is out of operation, the rollers 5 which are no longer rollable on the rails 2 forms a fulcrum about which the jack 3 is vertically movable to expand or contract. The rollers 5 are not movable along the rails 2, as the sprocket 19a, the roller chain 22, the sprocket 21 and hence the carrier 17 are held against movement when the operation of the motor 19 is discontinued. Alternatively, a hook may, for example, be provided for engaging at least one of the rollers 5 or its shaft to hold the jack 3 against horizontal movement. The shaft 9 which is fixed to the rails 6 forms a fulcrum about which the staionary jack 7 is vertically movable to expand or contract.

Figure 3:
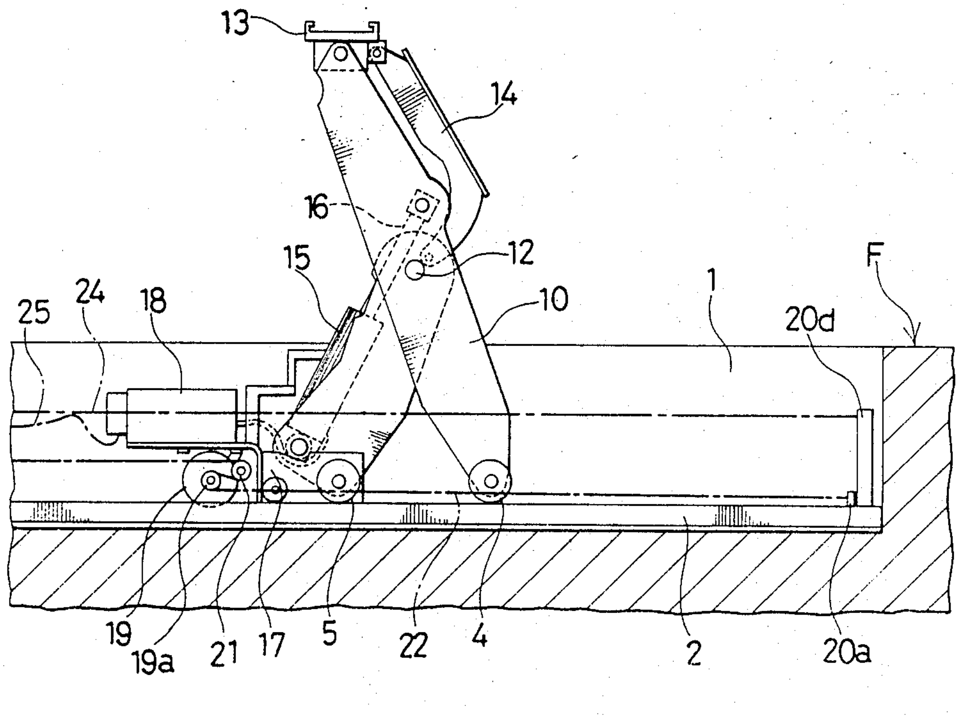
FIG. 3 is a front elevational view of the movable jack in its vertically expanded or raised position.

If a hydraulic pressure is supplied from the hydraulic unit 18 to the hydraulic cylinders 15, the piston rods 16 is advanced to raise the outer links 10, as well as raising or rotating the inner links 11 about the rollers 5 counterclockwise as viewed in FIG. 1, while the rollers 4 are caused by the outer links 10 to move along the rails 2 toward the rollers 5. The outer and inner links 10 and 11 are raised until the table 13 is raised to its uppermost position in which its longitudinal centerline is vertically aligned with the axis of the rollers 5, as shown in FIG. 3. The table 13 is always held in its horizontal position by the links 14 throughout the vertical movement of the jack 3. If the cylinders 15 are operated in a reverse way to lower the jack 3, the jack 3 and all of the devices associated therewith, except the table 13, are retracted into the pit 1, as shown in FIG. 1.

The vertical movement of the stationary jack 7 is substantially equal to that of the jack 3 which has hereinabove been described. No repeated description is, therefore, made.

If the motor 19 is rotated in one direction, the sprockets 19a and 21 engaging the roller chain 22 are rotated in such a way as to approach the prop 20b and pull the carrier 17 in the same direction, whereby the jack 3 is moved toward the stationary jack 7. The motor 19 is stopped when the jack 3 has reached a desired position. If the motor 19 is rotated in the opposite direction, the jack 3 is moved back, or away from the jack 7.

Although only the outer links have been described as being provided with the rollers which are movable along the rails when the jack is expanded or contracted, it is possible to provide the inner links, too, with the same type of rollers.

Although one of the two jacks has been described as being horizontally movable, it is also possible to provide two or more horizontally movable jacks. A lift having two or more such jacks is particularly useful for handling a special vehicle. Although the two jacks have been described as being simultaneously operable, it is possible to design the lift in such a way that only one of the jacks may be raised, while the other jack is kept in its lowered position, if desired.

Although each jack has been described as being of the type which is composed of inverted Y-shaped combinations of links, it is also possible to employ any other link combinations, including a combination which defines a mirror image of that shown in the drawings, an X-shaped combination which is typically known as forming a scissors jack, and a pantograph combination. The combinations of the links, the length thereof, the size of the hydraulic cylinders and the location thereof depend on the size or weight of the vehicle which the lift is intended to handle, the height which the vehicle supporting tables are required to reach when they are raised, and other conditions that must be taken into account when the lift is used.

Although the vehicle supporting table on each jack has been described as being carried only on the outer links, it can alternatively be carried on both the outer and inner links if the jack is, for example, of the type comprising X-shaped combinations of links.

As is obvious from the foregoing description, the lift of this invention has a very small overall height when the jacks are contracted. Its height is so small that it can be accommodated within a pit having a depth which is as small as about one-third of that of any such pit that has hitherto been required. The pit having such a small depth is, of course, much less costly to make and the reduction in the cost of pit excavation naturally results in a reduction in the cost of lift installation and maintenance and the ease of its maintenance and repair. As the whole lift is installed in the pit, no underground piping is required any longer. This fact contributes to achieving a further reduction in the cost of lift installation and facilitating the prevention of any accident caused by the failure of the piping and the maintenance and repair of the lift.

While the invention has been described with reference to the preferred embodiment thereof, it is to be understood that modifications or variations may be easily made by anybody of ordinary skill in the art without departing from the scope of this invention which is defined by the appended claims.

What is claimed is:

1. An underground vehicle lift comprising (a) at least first and second vertically expanding and contracting jack assemblies disposed in a pit in a mutually juxtaposed relation and each including a pair of parallel link mechanisms, (b) first and second rails provided at the bottom of the pit, (c) a first roller provided on a first link of each of the link mechanisms of the first jack assembly and rollably supported on one of the first rails, (d) a second roller provided on a second link of each of the link mechanisms of the first jack assembly and rollably supported on one of the first rails, (e) a third roller provided on a link of each of the link mechanisms of the second jack assembly and rollably supported on one of the second rails, (f) a vehicle supporting table supported horizontally on each of the jack assemblies, (g) means for vertically expanding and contracting the link mechanisms of the first jack assembly together to expand and contract the first jack assembly, thereby raising and lowering its table, the first rollers being rolled on the first rail when the first jack assembly is expanded and contracted, (h) means for vertically expanding and contracting the link mechanisms of the second jack assembly together to expand and contract the second jack assembly, thereby raising and lowering its table, the third rollers being rolled on the second rails when the second jack assembly is expanded and contracted, (i) driving means connected to the first jack assembly for moving the first jack assembly horizontally along the first rails toward and away from the second jack assembly, both the first and second roller being rolled on the first rails when the first jack assembly is moved horizontally, (j) a first fixing means for temporarily preventing the second rollers from rolling on the first rails, thus enabling the first jack assembly to be expanded and contracted in a selected fixed position on the first rails as well as enabling the entire first jack assembly to be fixed on the first rails when the first jack assembly is in an expanded position, and (k) a second fixing means for permanently preventing the second jack assembly from moving horizontally.

2. A lift as set forth in claim 1, wherein the driving means and the first fixing means comprise a motor connected to the first jack assembly and a roller chain provided in the pit, said motor having a shaft with a sprocket engaging the roller chain.

3. A lift as set forth in claim 2, wherein the first and second links of each of the link mechanisms of the first jack assembly are joined to each other to form a substantially inverted Y-shaped link combination, and each of the link mechanisms of the second jack assembly includes another link joined to said link thereof to form a substantially inverted Y-shaped link combination.

4. A lift as set forth in claim 3, wherein the pit has such a depth that substantially the entire lift can be retracted into the pit.

5. A lift as set forth in claim 2, wherein the pit has such a depth that substantially the entire lift can be retracted into the pit.

6. A lift as set forth in claim 1, wherein the first and second links of each of the link mechanisms of the first jack assembly are joined to each other to form a substantially inverted Y-shaped link combination, and each of the link mechanisms of the second jack assembly includes another link joined to said link thereof to form a substantially inverted Y-shaped link combination.

7. A lift as set forth in claim 6, wherein the pit has such a depth that substantially the entire lift can be retracted into the pit.

8. A lift as set forth in claim 1, wherein the pit has such a depth that substantially the entire lift can be retracted into the pit.

* * * * *